(12) United States Patent
Chapman

(10) Patent No.: US 6,173,402 B1
(45) Date of Patent: Jan. 9, 2001

(54) TECHNIQUE FOR LOCALIZING KEYPHRASE-BASED DATA ENCRYPTION AND DECRYPTION

(75) Inventor: Richard Alan Chapman, New Fairfield, CT (US)

(73) Assignee: International Business Machines Corporation, Armonk, NY (US)

( * ) Notice: Under 35 U.S.C. 154(b), the term of this patent shall be extended for 0 days.

(21) Appl. No.: 09/034,296

(22) Filed: Mar. 4, 1998

(51) Int. Cl.[7] .................................................. G06F 12/14
(52) U.S. Cl. ............................................................ 713/182
(58) Field of Search ................................... 713/182, 185, 713/186, 189, 190, 193, 200

(56) References Cited

U.S. PATENT DOCUMENTS 5,337,357 * 8/1994 Chou et al. ............................ 705/56
6,006,328 * 12/1999 Drake .................................... 713/200

* cited by examiner

*Primary Examiner*—Tod R. Swann
*Assistant Examiner*—Matthew Smithers
(74) *Attorney, Agent, or Firm*—Gregory M. Doudnikoff; Marcia L. Doubet

(57) ABSTRACT

A technique, system, and computer program for protecting data stored by a computer system in a computing environment having a connection to a public network. The stored data is created and accessed by a software application, which encrypts it for storing and decrypts it for processing. A secret, immutable value specific to the computer system on which the software is running is combined with information identifying an authorized user in order to form the input key used by the encryption and decryption facilities of the software. Optionally, the secret value can be exposed to the user in order to move the encrypted data to another environment.

20 Claims, 4 Drawing Sheets

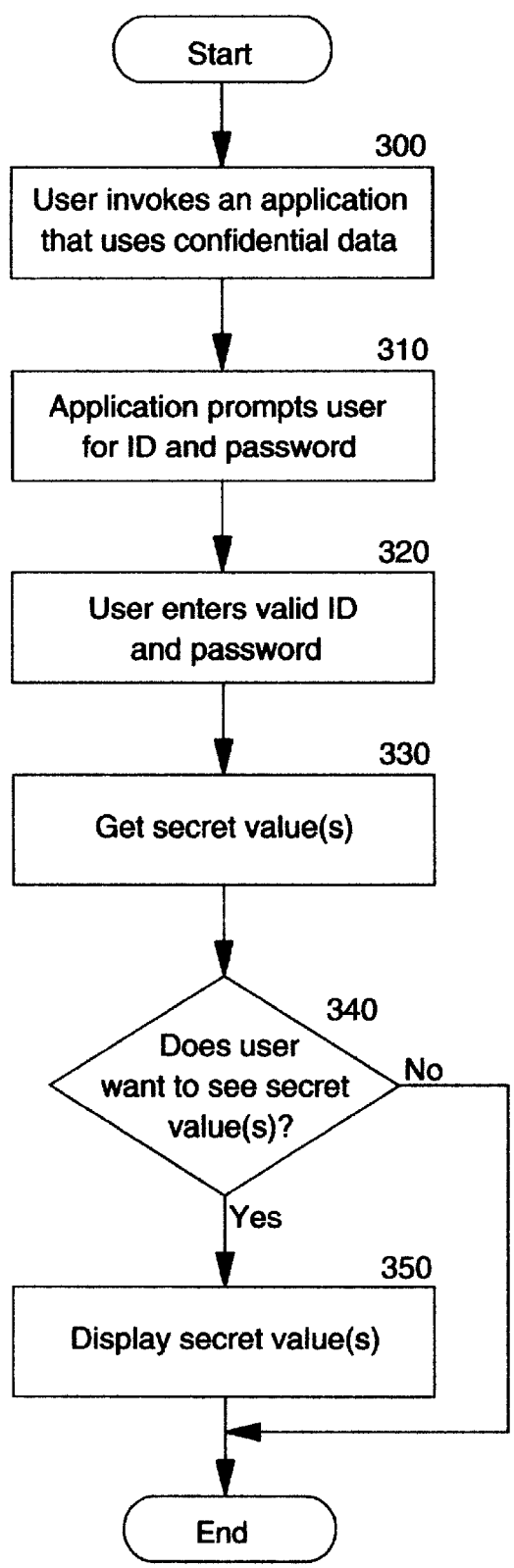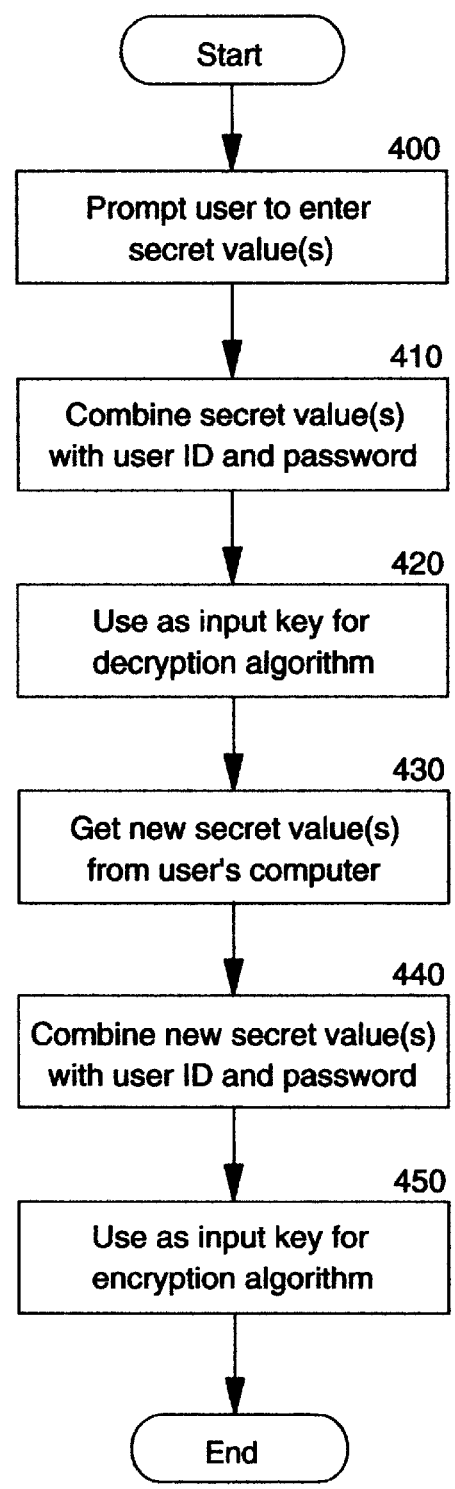
FIG. 4A
FIG. 4B

TECHNIQUE FOR LOCALIZING KEYPHRASE-BASED DATA ENCRYPTION AND DECRYPTION

BACKGROUND OF THE INVENTION

1. Field of the Invention

The present invention relates to computer security, and deals more particularly with a technique, system, and computer program for protecting data stored by a computer, by incorporating localized information into encryption and decryption algorithms used when storing and accessing the data.

2. Description of the Related Art

In an environment where computers are connected through insecure public networks, there is a rising concern for the security of private data stored on the computers. Possible into individual computers through various "hacking" techniques makes each machine vulnerable to attacks, thereby exposing the stored confidential data.

The Internet is a well-known example of a public network having these attributes. Users attach computers to the Internet through the services of an Internet Service Provider (ISP). An ISP provides computer users the ability to dial a telephone number using their computer modem, thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users.

After having connected into the public network in this way, a user may find that data on his machine has been compromised. Or, even more alarmingly, data may have been comprised without the user ever suspecting a problem. There are various ways in which a hacker may access the data on the user's machine. One way is through what is known as a "Trojan horse". This term is used to describe software that masquerades as a useful or interesting application, but that will, if loaded onto the user's computer, perform some type of destructive function in addition to, or instead of, the function the user expects. The user may locate this type of software while using the Internet, and be persuaded to download it, for example by text which describes the software as providing some desirable function for free. Once the software has been downloaded to the user's machine, any conceivable type of destructive action is possible: the Trojan horse may be designed to erase files; to write over existing files with information supplied by the Trojan horse; to locate particular files and forward them out into the Internet, to an address the intruder (i.e. the Trojan horse creator) can receive them; to monitor the user's keystrokes, and forward those to the intruder through the Internet; and so forth.

The Internet is used by millions of people around the world on a daily basis. Many of these users are business users, performing business functions. Others are individuals, using the Internet for personal reasons. Businesses that make Internet access available to their employees may have computer security programs in place to minimize the likelihood of intrusion by an outsider. Many individuals, however, will be accessing the Internet from their home computer. Very few of them are likely to appreciate the possibility of destructive access to their machine, and thus will have little or no security mechanisms protecting their data. Hackers have developed software that can find machines which are vulnerable to specific types of attack, by accessing the machines (with a Trojan horse as described above, for example) and then checking for particular security mechanisms. If a vulnerable machine is found, its address and type of security deficiency is forwarded to the hacker by the intruding software.

With the growing popularity of electronic commerce on the Internet, one can begin to better understand the importance of preventing these electronic intruders. Destructive functions are no longer limited to such things as destroying data stored on the user's computer (which will perhaps take many hours to recreate), but may have a very real financial impact as well. Electronic commerce includes on-line shopping, on-line bill paying, inquiry into account information, etc. To participate in electronic commerce, the user will often provide confidential information such as his credit card information or bank checking account number. This information will then be forwarded out into the Internet, to the remote computer providing the electronic commerce service. Depending on the sophistication of the electronic commerce software installed on the user's computer and on the remote computer, this confidential information may or may not be encrypted during transmission. Credit card numbers and bank account numbers tend to have a short, formatted structure. When this type of data is sent through the Internet unencrypted, it can be easily recognized by hacker-written software that monitors Internet transmissions. The hacker then has all the information he needs to use the account as his own. However, encrypting this type of confidential information during transmission does not completely protect it from being electronically stolen: as discussed above, Trojan horse software may be introduced to the user's computer which will be just as dangerous. The confidential information may have been stored on the user's computer by the electronic commerce application software. Or, for that matter, the user may have financial software packages installed on his machine which never interact with other computers in the Internet, but which store data such as account numbers for use with that package. It is an easy task for a hacker to determine the file naming conventions used by electronic commerce or financial software applications. Once the Trojan horse is downloaded to the user's computer, it simply searches for known file names, and forwards a copy of the files it finds out into the Internet, to the waiting hacker. Or, it may search through all the computer's stored files for data having the attributes of credit card numbers or account numbers, and forward those files.

If the user's confidential data was encrypted before it was stored on the user's computer, however, then it is of no use to the hacker—unless he can decrypt it. Successful decryption requires the hacker to discover the particular encryption algorithm that was used, in order to reverse the transformations the algorithm made on the data. A number of types of encryption algorithms, and corresponding decryption algorithms, are in common use today. The combination of an encryption algorithm and corresponding decryption algorithm is known as a "cipher". One popular category of ciphers is known as "private key" ciphers. With this type of cipher, the functionality of the encrypting and decrypting algorithms is publicly known. The Data Encryption Standard ("DES") is an example of this type of publicly-known cipher. In order to protect data by encrypting it with a known encryption algorithm, the algorithm requires use of a secret, or private, key. A key is a value entered by a user of the algorithm, and factored into operation of the algorithm in such a way that the resulting encrypted data is dependent upon the key value. The decryption algorithm requires use of a secret key as well. When the same secret key is used for both the encryption and decryption algorithms, the cipher is referred to as "symmetric". DES is a symmetric cipher. If someone knows the key used during encryption, and has a copy of the encrypted information, that person will be able to decrypt the information.

If the transformations performed in a cipher were simple, it would be relatively easy to guess what had been done, and then undo it. Or, a software application can be written that performs what is known as a "brute-force attack", whereby the software systematically tries to discover the transformations. Because of this, ciphers tend to be comprised of very complex mathematical transformations. The more complex they are, the more difficult it will be for a brute-force attack to succeed. As a result, the number of ciphers in use is fairly small. Thus, even if a hacker does not know which cipher was used when encrypting data, there are a small number of possibilities to try in the brute-force attack.

Another type of attack that is common when trying guess the transformations performed by a cipher is known as a "dictionary attack". In this type of attack, a hacker uses a stored file of textual information (for example, a file storing the text of an on-line book), referred to as the dictionary, and systematically supplies each text string in that file to the cipher as the key for decrypting an encrypted file. If readable text results from any of these decryption attempts, then it can be assumed that this text string is a valid key. When a user's ID and password have been used as the key, then it is very likely that there is some file on their computer system where that information is stored. If a hacker locates this file, and uses it in a dictionary attack, then he will have gained access to all stored data that was encrypted using that ID and password. Computer users have a tendency to use common words or names for their user ID and/or password, thereby increasing the chance that a dictionary attack, using a dictionary that contains many common words, will succeed.

Software applications that use confidential data often have mechanisms to limit application usage to authorized users. These applications require the user to identify himself, and then use this identification to determine whether the user is authorized. In order to prevent an unauthorized person from gaining access by simply guessing the identification used by someone who is authorized, the applications also typically require the user to enter a password. The application will have stored the identification and password for each authorized user during a configuration step, and compares the information entered by a user requesting access to the stored information: if there is a match, then this user is authorized to use the software, and is given access. But this type of authorization checking presents another vulnerability to intrusion: a Trojan horse may be downloaded that searches for the file in which the authorized user information is stored. Knowing this information allows a hacker to electronically impersonate an authorized user, and gain access to supposedly secure applications and data.

Encrypting the files where identification and password information is stored prevents a hacker from using one of the valid identification-password combinations, unless the hacker can decrypt the file as discussed above.

When a file is to be encrypted before storing it, a common technique is to use the identification-password combination as the secret key for the encryption algorithm. If the user keeps his password (and optionally the character string he uses for his identification) secret, and uses an encryption algorithm that provides a strong degree of protection, then it will be fairly difficult to decrypt the data using a brute-force attack. However, a security exposure exists due to the fact that the user must type his identification and password on the keyboard to identify himself when he begins using the application software. If a keystroke-monitoring Trojan horse is running on the user's machine, the hacker will be sent a file from which he can deduce what the name of the particular application was, the identification of an authorized user of that application, and the user's password. All that remains unknown for decrypting the encrypted information stored by this application is the particular manipulations of the user identification and password that were performed by the encryption algorithm. If the hacker has access to a copy of the application software, then he does not even need to know what those manipulations were: he simply runs the application, supplies the user's identification and password to it, and the application will perform the decrypting manipulations for the hacker as if he were the authorized user. Even encrypting the user's identification and password will not protect the user's data in this scenario: the hacker has captured the necessary information before it was encrypted. (The term "ID" or "user ID" is used herein as an abbreviation of "user identification".)

Accordingly, a need exists for a technique by which stored information can be protected even in the presence of keystroke monitoring. The proposed technique provides an additional secret value to be used for computing the secret encryption key, where this value is not typed in by the user. The secret value used by the proposed technique is an immutable characteristic of the user's computer, so that a hacker would need to have access to the user's computer in order to decrypt the stored information. Further, a need exists for a system and method by which this information can be protected regardless of whether the information is stored on the computer on which it was originally created, enabling the user to move his encrypted files to a different computer. Optionally, the secret value can be exposed to the user on request, so that he may decrypt the data if the secret value is not otherwise available.

SUMMARY OF THE INVENTION

An object of the present invention is to provide a technique whereby the security of information stored by a computer is protected even in the presence of keystroke monitoring.

Another object of the present invention is to provide a technique whereby a secret value is used in computing the secret key for a data encryption and decryption algorithm.

Yet another object of the present invention is to provide a technique whereby this secret value protects the user's data from brute-force attacks and from dictionary attacks.

Still another object of the present invention is to provide a technique whereby this secret value is not typed in by the computer user.

A further object of the present invention is to provide a technique whereby the secret value may optionally be exposed to the computer user, so that he can decrypt the stored data when the secret value is not otherwise available.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented process for use in a computing environment capable of having a connection to a public network, for protecting data stored by a computer system in the environment, comprising an encryption algorithm to encrypt the data to be stored, using an input key; a decryption algorithm to decrypt the stored data for processing, using the same input key; a subprocess for prompting a user for a first value that identifies the user and can be used to verify that the user is entitled to access the data; a subprocess for retrieving a second value from the computer system without input from the user, where this second value is at least one immutable characteristic of the computer system; and a subprocess for combining the first value and the second value as the input key. Preferably, the subprocess for combining comprises exclusive ORing the first value with the second value. Alternatively, the subprocess for combining comprises concatenating the second value to the first value. Preferably, the first value comprises a user identification and a user password. Operation of the subprocess for combining may be preceded by operation of a subprocess for performing a one-way hashing operation on the first value, or on the second value. Or, the values may be combined, and the result of the combination hashed. Each immutable characteristic may be a characteristic of the computer hardware, such as the central processing unit serial number or the serial number of the device on which the stored data is stored, or it may be a characteristic of the computer software. Optionally, the retrieved second value can be displayed to the user. Additional subprocesses capable of later execution on a different computer system can be added, where those additional subprocesses include: a subprocess for requesting the user to input the displayed second value; a subprocess for retrieving a third value from this different computer system; a subprocess for combining the first value and the input second value as a decryption key; and a subprocess for combining the first value and the third value as an encryption key.

Additionally, the present invention provides a system for use in a computing environment capable of having a connection to a public network, for protecting data stored by a computer system in this environment, comprising a means for encrypting the data to be stored, using an input key; a means for decrypting the stored data for processing, using the same input key; means for prompting a user for a first value that identifies the user and can be used to verify that the user is entitled to access the data; means for retrieving a second value from the computer system without input from the user, where this second value is at least one immutable characteristic of the computer system; and means for combining the first value and the second value as the input key. Preferably, the means for combining comprises exclusive ORing the first value with the second value. Alternatively, the means for combining comprises concatenating the second value to the first value. Preferably, the first value comprises a user identification and a user password. Operation of the means for combining may be preceded by operation of a means for performing a one-way hashing operation on the first value, or on the second value. Or, the values may be combined, and the result of the combination hashed. Each immutable characteristic may be a characteristic of the computer hardware, such as the central processing unit serial number or the serial number of the device on which the stored data is stored, or it may be a characteristic of the computer software. Optionally, the retrieved second value can be displayed to the user. Additional means capable of later execution on a different computer system can be added, where those additional means include: means for requesting the user to input the displayed second value; means for retrieving a third value from this different computer system; means for combining the first value and the input second value as a decryption key; and means for combining the first value and the third value as an encryption key.

Additionally, the present invention provides a method for protecting data stored by a computer system in a computing environment capable of having a connection to a public network, comprising the steps of encrypting the data to be stored, using an input key; decrypting the stored data for processing, using the same input key; prompting a user for a first value that identifies the user and can be used to verify that the user is entitled to access the data; retrieving a second value from the computer system without input from the user, where this second value is at least one immutable characteristic of the computer system; and combining the first value and the second value as the input key. Preferably, the combining step comprises exclusive ORing the first value with the second value. Alternatively, the combining step comprises concatenating the second value to the first value. Preferably, the first value comprises a user identification and a user password. Operation of the combining step may be preceded by operation of a step for performing a one-way hashing operation on the first value, or on the second value. Or, the values may be combined, and the result of the combination hashed. Each immutable characteristic may be a characteristic of the computer hardware, such as the central processing unit serial number or the serial number of the device on which the stored data is stored, or it may be a characteristic of the computer software. Optionally, the retrieved second value can be displayed to the user. Additional steps capable of later execution on a different computer system can be added, where those additional steps include: requesting the user to input the displayed second value; retrieving a third value from this different computer system; combining the first value and the input second value as a decryption key; and combining the first value and the third value as an encryption key.

The present invention will now be described with reference to the following drawings, in which like reference numbers denote the same element throughout.

BRIEF DESCRIPTION OF THE DRAWINGS

FIGS. 4a and 4b illustrates a flow chart which sets forth the logic involved with an alternative embodiment of the present invention.

DESCRIPTION OF THE PREFERRED EMBODIMENT

Figure 1:
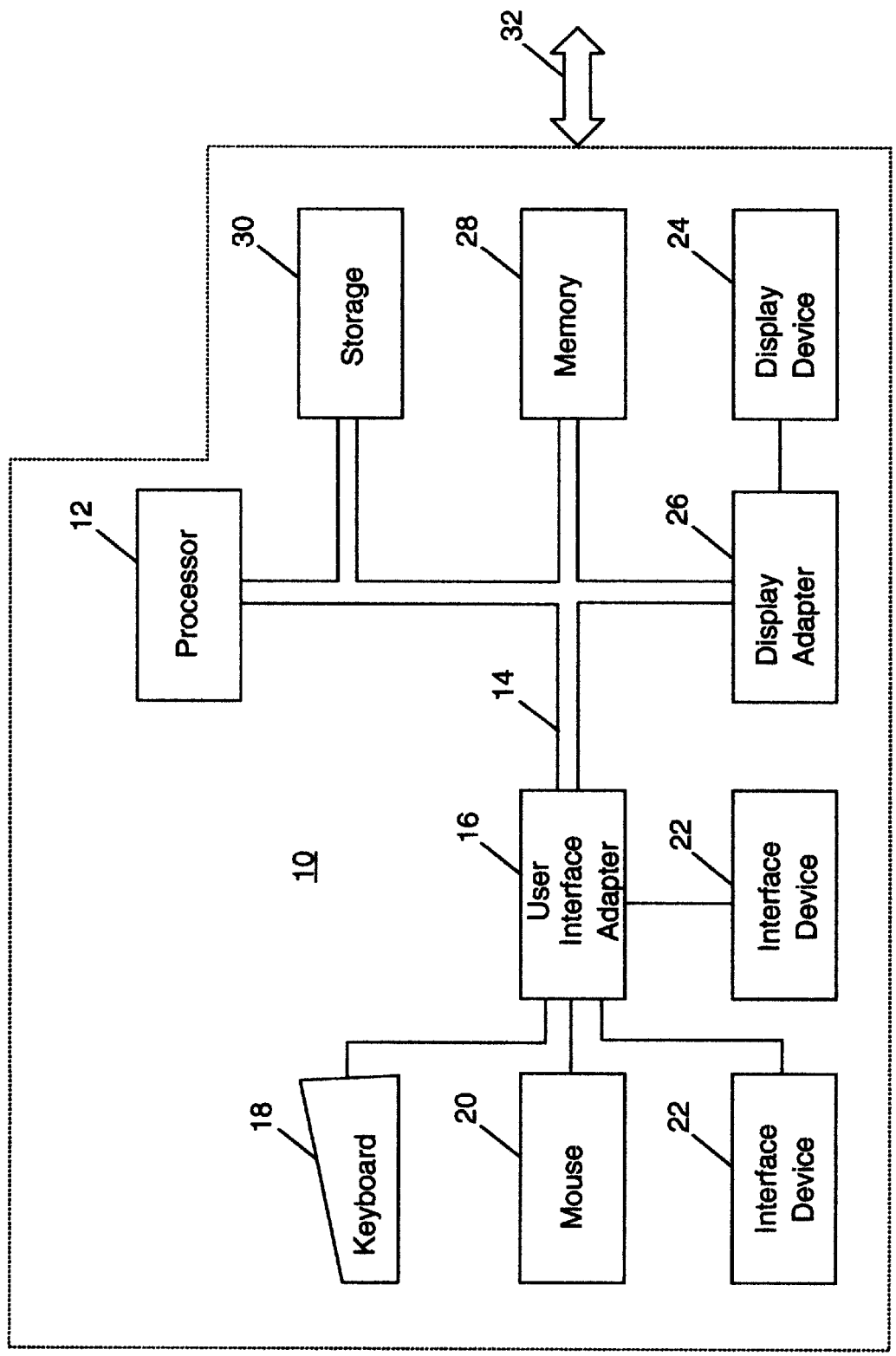
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
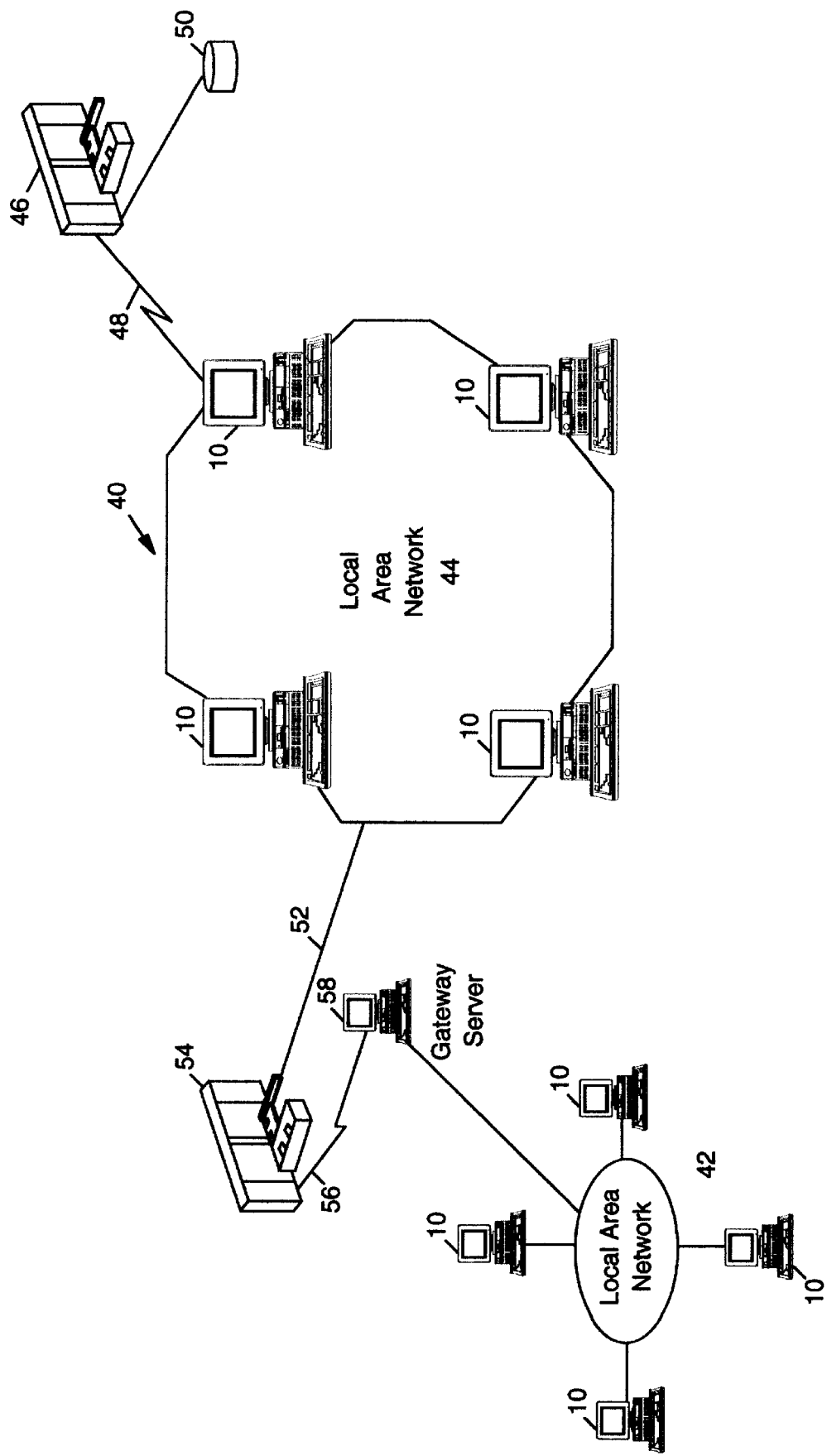
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The encrypted data resulting from use of the present invention may be stored on any of the various media types used by the long-term storage 30, or may be sent from the workstation 10 to another computer or workstation of the network illustrated in FIG. 2 over the communications channel 32, for storage by that other computer or workstation.

The preferred embodiments of the present invention will now be discussed with reference to FIGS. 3 and 4.

In the preferred embodiments, the present invention is implemented as a computer software program. The program will be used with software applications that access confidential data, such as electronic commerce applications or financial management software applications. The applications may execute entirely on the user's computer, as a stand-alone software package, or they may execute partly on the user's computer and partly on a remote computer. In the latter scenario, the remote computer may be connected to the user's computer through a LAN or a WAN that is part of a network owned or managed internally to the user's company, or the connection may be made through the Internet using an ISP. What is common to all applicable environments is that the user accesses a public network, such as the Internet, through his computer, thereby making the data it stores vulnerable to attack by an electronic intruder. (Note that the public network access is not required to involve the software application accessing the confidential data. As noted earlier, any type of public network access, include merely clicking on executable Web page entries, introduces the possibility of intrusion.)

The present invention requires the software application to provide data encryption and decryption facilities, where the facilities are provided by algorithms using a secret symmetric input key. Data encryption is used to store the data created or processed by the application, and data decryption is used to access that stored, encrypted data when it is needed for further processing. The present invention also requires the software application to verify that users are authorized (for example, by prompting the user for his ID and password, and comparing that information to previously-stored values). The present invention combines the user authorization information with a secret, immutable value that is particular to the computer system on which the software application is running, and uses this combined value as the input key for the encryption and decryption algorithms. A number of types of combining operations are possible, and a number of sources for the immutable value are also possible. By using the secret value in this way, the present invention protects the user's stored encrypted data from brute-force attacks and dictionary attacks. Since the immutable value is specific to the user's computer system, a hacker would need to have access to the user's own computer, and execute the decryption algorithm on that computer, in order to decrypt data stored there. This will be much more difficult for a hacker than merely stealing a user ID and password, thereby greatly enhancing the security of the user's stored information.

Optionally, the present invention can be requested to expose the immutable value to the user. This would be needed if, for example, the encrypted data was stored on removable media that was being transported to a different computer, for use by a compatible software application. In that case, the present invention would also allow the user to enter the immutable value from the keyboard, in order for the decryption algorithm to be able to decrypt the data. Because the typing of all values used to form the input key makes the stored data again vulnerable to a keystroke monitoring Trojan horse, the present invention retrieves a new immutable value, specific to the computer system on which the data is now being processed, when it operates in this mode.

Figure 3:
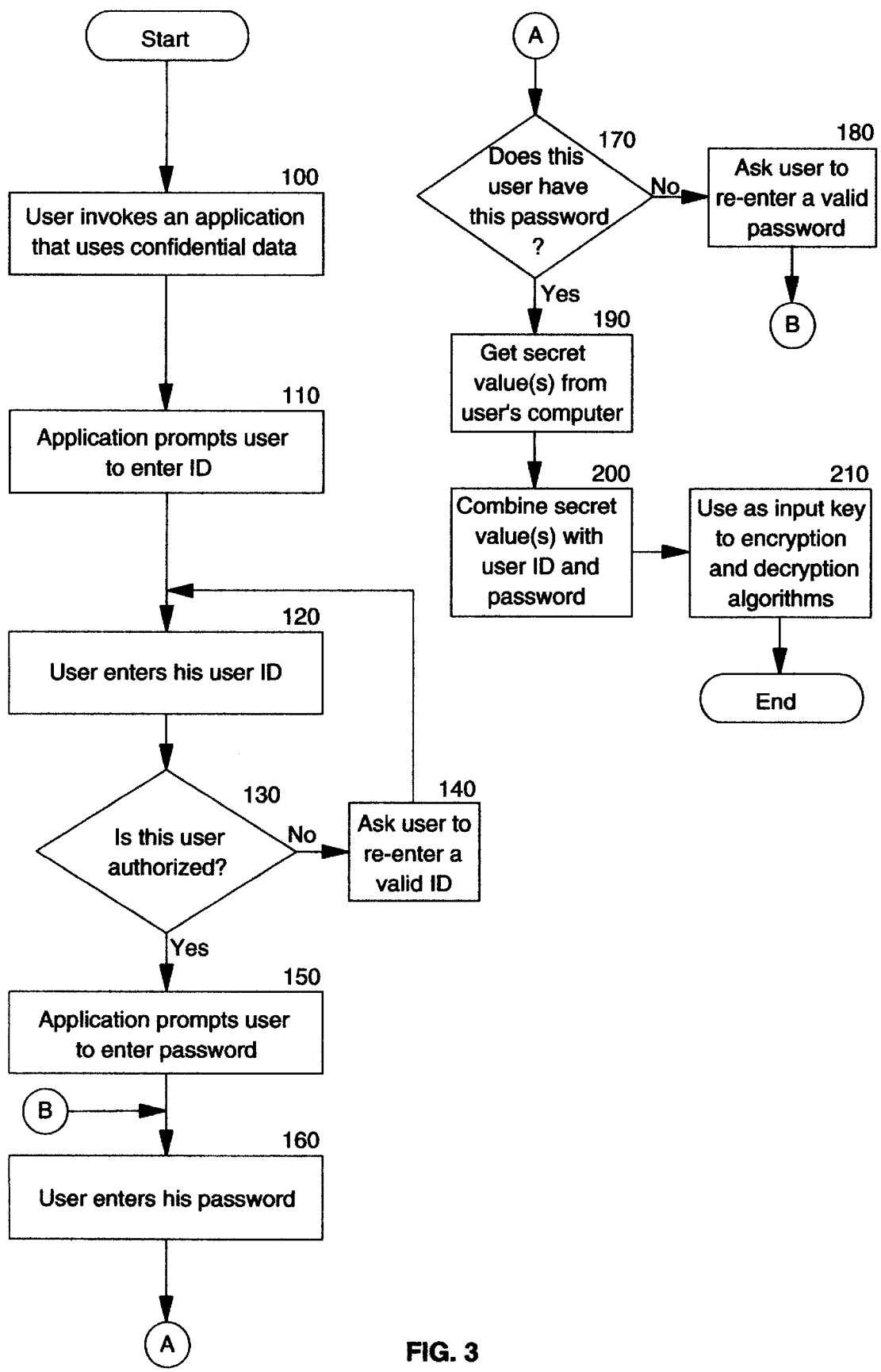
FIG. 3 illustrates a flow chart which sets forth the logic involved with a preferred embodiment of the present invention.

FIG. 3 illustrates the logical steps performed when a preferred embodiment of the present invention is used to protect data stored by a user's computer.

The process begins at Step 100, when the user requests to use a software application that accesses confidential information. The user request may be made by typing the name of the application on the computer's command line, or by selecting an icon representing the application with a selecting mechanism such as a mouse.

At Step 110, the application prompts the user to enter his user ID. The user enters this information at Step 120, by typing a character string on the computer keyboard.

A comparison is made at Step 130 between the user ID entered by the user, and the authorized user IDs known to the application. The application will have previously been configured to recognize specific user IDs as being authorized, for example in a setup phase of the application software. Techniques for configuring authorized IDs are well known in the art.

If the test at Step 130 has a negative result, control transfers to Step 140 to give the user another chance to enter a recognized user ID. After accepting the new input at Step 120, the comparison at Step 130 is performed again. (Optionally, a counter may be used to keep track of the number of times an unrecognized user ID is entered. If a predetermined number of incorrect attempts is made, the user will be denied access, and the process shown in FIG. 3 terminates abnormally. This manner of accepting and validating user input is well known in the art, and has not been illustrated in detail in FIG. 3.)

If the test at Step 130 has a positive result, then this is a recognized user, and control transfers to Step 150.

At Step 150, the application prompts the user to enter his password. The user enters a character string representing his password at Step 160, by typing the characters on the computer keyboard.

A comparison is made at Step 170 between the password entered by the user, and the stored password associated with the authorized user having this recognized ID. The application will have previously been configured to associate a specific password with each user ID.

If the test at Step 170 has a negative result, control transfers to Step 180 to give the user another chance to enter a valid password. After accepting the new input at Step 160, the comparison at Step 170 is performed again. (Optionally, a counter may be used to keep track of the number of times an invalid password is entered. If a predetermined number of incorrect attempts is made, the user will be denied access, and the process shown in FIG. 3 terminates abnormally. As discussed above for entry of the user ID, this technique is well known in the art and has not been illustrated in detail in FIG. 3.)

If the test at Step 170 has a positive result, control transfers to Step 190. At Step 190, a secret value is automatically retrieved by the present invention, without input from the user. This secret value is an immutable value uniquely associated with the computer on which the application program is currently running. In the preferred embodiment, this secret value is an immutable characteristic of the hardware. For example, it may be the serial number of the central processing unit, or the serial number of the disk drive on which the file will be stored. Serial numbers are uniquely assigned to hardware during manufacture of the device, and do not change over time. Procedures are built into computer operating systems that will retrieve serial numbers of specified devices. The present invention retrieves one or more of these values using the mechanism appropriate to the operating system on which the software is designed to run.

Alternatively, the secret value retrieved may be a characteristic some aspect of the computer software for the system on which the present invention is running. Operating systems typically provide built-in procedures that will retrieve information on request. For example, a "version" command may be supported by the operating system, which will display a message indicating what version of the operating system is running. In the IBM OS/2 operating system, this facility is invoked by issuing the command "VER" or "ver"; in response, a string of approximately 35 characters is returned to the requester. As a further example, issuing the command "VOL" or "vol" in the IBM OS/2 operating system returns a multi-line character string of more than 70 characters. ("OS/2" is a registered trademark of the IBM Corporation.) Similar facilities are often provided by software applications, which display version information upon request.

Step 200 uses the retrieved secret value, and combines it with the user's ID and password. The resulting combination is then used as the input key to an encryption/decryption algorithm in Step 210.

In the preferred embodiment, the combination performed at Step 200 consists of performing an exclusive OR operation, where the first operand is the secret value and the second operand is the user ID concatenated to the user password. In an alternative embodiment, this combining operation comprises concatenating the user ID, user password, and secret value. In another alternative embodiment, the secret value first is processed by a one-way hashing algorithm, before being combined with the user ID and password. A one-way hashing algorithm is a technique whereby a variable-length input value is mathematically or otherwise manipulated to generate a fixed-length output value, from which the original input value cannot be economically derived. Hashing techniques are well known in the art. In yet another alternative embodiment, the secret value remains unchanged, and it is the user ID and password that are processed by a hashing algorithm before being combined with the secret value. In a further alternative, an exclusive OR operation may be performed on the secret value and the combination of user ID and password, with the result of this operation then used as input to the one-way hashing algorithm.

If a remote computer is involved, on which the application processing the confidential information resides, then an alternative embodiment may be used which prompts the user to enter both the user ID and password at the same time, and verifies the two items of information together, to optimize performance and minimize network traffic. In this situation, the Steps 110 and 150 would be combined to prompt the user only once; the Steps 120 and 160 would be combined, for the user to enter his responses in one operation; the Steps 130 and 170 would be combined, to verify the entered data in one operation; and the Steps 140 and 180 would be combined, to ask the user to re-enter his user ID and password if the combination does not identify an authorized user.

FIG. 4 illustrates the logical steps performed when an alternative embodiment of the present invention is used to protect data stored by a user's computer.

In this alternative embodiment, the present invention may provide a mechanism to expose the secret value to the user, so that the encrypted data can be transported to a different computer system for use with a compatible software application. In this embodiment, the manner of exposing the secret value can be by user request, such as allowing the user to press a predefined key on the keyboard and displaying the value on the computer display in response, or the secret value could automatically be exposed through the display each time it is retrieved, without any user request required. Because the user is still not typing this secret value on the keyboard, it will not be captured by a keystroke-monitoring Trojan horse. To support the ability to move the data to another system, and still be able to decrypt it even though the secret value was specific to the computer system on which it was encrypted, this embodiment would also need to allow the user to enter the secret value at the new computer system. The embodiment would accomplish this by prompting the user (as a replacement for Step 190 of FIG. 3) to enter the secret value used for encryption, combine that input with the user ID and password (as a replacement for Step 200 of FIG. 3), and use the result as the input key to decrypt the data files (as a replacement for Step 210 of FIG. 3). Then, after the embodiment knows the values to use for decrypting the data files, it should retrieve a new immutable secret from the computer system on which the data is now being processed, combine that new secret value with the user ID and password, and use the result as the input key for encrypting the data to be stored on the local system. If this process of retrieving a new secret value immediately follows entry of the previous secret value, and re-encrypting the data using the new value, the period of vulnerability of the data to a keystroke-monitoring Trojan horse is minimized.

FIGS. 4A and 4B describe this process, and shows how this alternative embodiment differs from the embodiment depicted in FIG. 3. For brevity, some of the details from FIG. 3 have been consolidated in FIGS. 4A and 4B, where those details are not material to the difference in embodiments.

The process shown in FIG. 4A illustrates how the secret value used in encryption is made known to the user, while the user has his data on the original computer on which data was encrypted. At Step 300, the user invokes the application software. The application prompts the user for his user ID and password at Step 310. Step 320 shows that the user has entered this information, and it has been accepted by the application as identifying an authorized user. The secret value is retrieved from the user's computer at Step 330.

At Step 340, the application asks the user whether he would like to view the secret value to be used for encryption and decryption. If he does not, then the process of FIG. 4A completes, and the secret value is known only to the software application. If the user does want to see the secret value, then it is displayed to him at Step 350, and the process completes. Alternatively, the software application may always display this value to the user, in which case Step 340 is omitted.

The process shown in FIG. 4B illustrates how the secret value is made known to the software application, and used for decrypting already-encrypted data, after the user has moved to data to a different computer.

Step 400 prompts the user to enter the secret value, which he has learned from the process of FIG. 4A. The application then combines this entered value with the user's ID and password at Step 410, and uses it to decrypt the stored data at Step 420. The application then gets a new secret value, which represents an immutable characteristic of the computer on which the data is now being used, in Step 430. Step 440 combines that the new secret value with the user ID and password, and uses that combined value to encrypt data at Step 450.

The preferred embodiments have been described as using one secret value, which is an immutable characteristic of the computer hardware or computer software of the system on which the application program is running. In a further alternative embodiment, more than one secret value may be used. For example, the serial number of the central processing unit, the serial number of the disk drive, and the version of the operating system may all be combined to form the secret value. The combination of secret values may be performed in any manner by the software application implementing the present invention, without deviating from the scope of invention. For example, an exclusive OR operation may be performed on all the secret values, and this result may optionally be used as input to a one-way hashing algorithm; each secret value may first be processed by a one-way hashing algorithm, with these results used as operands for an exclusive OR operation; etc. The resulting value may be combined with the user ID and password in any manner, as has been described herein. The application software implementing the present invention will have a specific process defined for combining the values, and transforming them. Because this process is known to the software application and used during encryption, it can be used by that application to decrypt the encrypted data.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed:

1. In a computing environment capable of having a connection to a public network, computer readable code for protecting data stored by a computer system in said environment, comprising:

an encryption algorithm to encrypt the data to be stored, wherein said encryption algorithm uses an input key;

a decryption algorithm to decrypt the stored data for processing, wherein said decryption algorithm uses said input key and wherein operation of said decryption algorithm results in restoration of said data to be stored;

a subprocess for prompting a user of said computer system for a first value, wherein said first value identifies said user and verifies that said user is entitled to access said data;

a subprocess for retrieving a second value from said computer system without input from said user, wherein said second value is comprised of at least one immutable characteristic of said computer system; and a subprocess for combining said first value and said second value as said input key.

2. Computer readable code for protecting data stored by a computer system according to claim 1, wherein said subprocess for combining comprises exclusive ORing said first value with said second value.

3. Computer readable code for protecting data stored by a computer system according to claim 1, wherein operation of said subprocess for combining is preceded by operation of a subprocess for performing a one-way hashing operation on said first value.

4. Computer readable code for protecting data stored by a computer system according to claim 1, wherein operation of said subprocess for combining is preceded by operation of a subprocess for performing a one-way hashing operation on said second value.

5. Computer readable code for protecting data stored by a computer system according to claim 1, wherein said subprocess for combining further comprises performing a one-way hashing operation on a result of said combining, and using said result as said input key.

6. Computer readable code for protecting data stored by a computer system according to claim 1, wherein at least one of said immutable characteristics is a characteristic of computer hardware used by said computer system.

7. Computer readable code for protecting data stored by a computer system according to claim 6, wherein said computer hardware characteristic is the central processing unit serial number.

8. Computer readable code for protecting data stored by a computer system according to claim 6, wherein said computer hardware characteristic is the serial number of the device on which said stored data is stored.

9. Computer readable code for protecting data stored by a computer system according to claim 1, wherein at least one of said immutable characteristics is a characteristic of computer software stored in said computer system.

10. Computer readable code for protecting data stored by a computer system according to claim 1, wherein said second value is comprised of two or more immutable characteristics of said computer system.

11. A system for protecting data stored by a computer system in a computing environment capable of having a connection to a public network, comprising:
    means for encrypting the data to be stored, wherein said means for encrypting uses an input key;
    means for decrypting the stored data for processing, wherein said means for decrypting uses said input key and wherein operation of said means for decrypting results in restoration of said data to be stored;
    means for prompting a user of said computer system for a first value, wherein said first value identifies said user and can be used to verify that said user is entitled to access said data;
    means for retrieving a second value from said computer system without input from said user, wherein said second value is comprised of at least one immutable characteristic of said computer system; and
    means for combining said first value and said second value as said input key.

12. The system for protecting data stored by a computer system according to claim 11, wherein said means for combining comprises concatenating said second value to said first value.

13. The system for protecting data stored by a computer system according to claim 11, wherein said means for combining further comprises performing a one-way hashing operation on a result of said combining, and using said result as said input key.

14. The system for protecting data stored by a computer system according to claim 11, wherein at least one of said immutable characteristics is a characteristic of computer software stored in said computer system.

15. The system for protecting data stored by a computer system according to claim 11, wherein said second value is comprised of two or more immutable characteristics of said computer system.

16. The system for protecting data stored by a computer system according to claim 11, wherein said retrieved second value is displayed to said user, and further comprising additional means capable of executing on a different computer system at a time subsequent to displaying said second value, wherein said additional means comprise:
    means for requesting said user to input said displayed second value;
    means for retrieving a third value from said different computer system;
    means for combining said first value and said input second value as a decryption key; and
    means for combining said first value and said third value as an encryption key.

17. A method of protecting data stored by a computer system in a computing environment capable of having a connection to a public network, comprising the steps of:
    using an encryption algorithm to encrypt the data to be stored, wherein said encryption algorithm uses an input key;
    using a decryption algorithm to decrypt the stored data for processing, wherein said decryption algorithm uses said input key and wherein said decryption algorithm results in restoration of said data to be stored;
    prompting a user of said computer system for a first value, wherein said first value identifies said user and can be used to verify that said user is entitled to access said data;
    retrieving a second value from said computer system without input from said user, wherein said second value is comprised of at least one immutable characteristic of said computer system; and
    combining said first value and said second value as said input key.

18. The method of protecting data stored by a computer system according to claim 17, wherein said first value comprises a user identification and a user password.

19. The method of protecting data stored by a computer system according to claim 17, wherein at least one of said immutable characteristics is a characteristic of computer software stored in said computer system.

20. The method of protecting data stored by a computer system according to claim 17, wherein said second value is comprised of two or more immutable characteristics of said computer system.

* * * * *